Figure 1:
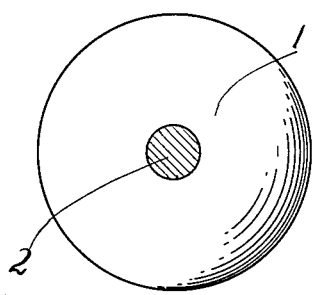

May 15, 1962  C. W. NEEFE  3,034,403
CONTACT LENS OF APPARENT VARIABLE LIGHT ABSORPTION
Filed April 3, 1959

INVENTOR.
BY Charles W. Neefe

United States Patent Office 3,034,403
Patented May 15, 1962

3,034,403
CONTACT LENS OF APPARENT VARIABLE LIGHT ABSORPTION
Charles W. Neefe, Big Spring, Tex., assignor to Neefe-Hamilton Research Company, Big Spring, Tex.
Filed Apr. 3, 1959, Ser. No. 803,968
1 Claim. (Cl. 88—54.5)

The herein disclosed invention relates to the field of ophthalmic optics and contact lenses in particular. The line of thought in this disclosure will pertain primarily to contact lenses, but applies equally to other fields, such as the implant lens used to replace the natural crystalline lens in some cataract operations.

Sunglasses, lenses which absorb part of the visible spectrum, are widely used as protection from the bright and harmful radiations from the sun. It is also understood that these dark tinted lenses are a disadvantage in dimly lighted areas and at night.

It is the object of this invention to produce a lens which for all practical purposes will be of dark tint when worn in the bright sunlight and of light overall effective tint when worn indoors under low level of illumination and at night. This apparent change in absorption will take place automatically and to the correct degree with no special or voluntary action on the part of the wearer. This lens is a sunglass lens when in bright sunlight and a lens of very light tint when in the dark. Other objects of the invention will become apparent as the specification proceeds. It is understood that this disclosure is merely illustrative and is in no way limiting and not confined to the exact features shown herein and changes in detail of construction are permissible without departing from the spirit of the invention and claims which follow.

The natural action of the iris controls the degree of tint or absorption of this lens. The central tinted area which is as large as the pupil when it is contracted to its smallest size in bright sunlight acts as the darkest sunglass tint. As the pupil enlarges due to less light entering the eye the outer clear parts of the lens are used, reducing the average or overall degree of tint. In a dark room such as a motion picture theater or at night time the pupil dilates to its largest natural size and the average or overall tint of the lens is very low due to the fact that if the pupil dilates to three and one half (3.5) times its smallest diameter, from two millimeters to seven millimeters, the area increases to twelve and one fourth (12.25) times and overall tint is reduced by a factor of 12.25 to one. It is understood that all persons may not have a normal iris reflex. This will not prevent these persons from receiving excellent results since a much smaller factor is acceptable. This new type lens is very effective in the bifocal contact lens of simultaneous foci, the distance segment being tinted and reading segment clear. In the bright sunlight the wearer has the effect of sunglasses, which for bifocals I recommend a medium or light tint, indoors under lower level of illumination the reading segment which is clear comes into greater use as the pupil dilates. This is as it should be since most close work is carried on indoors. Also as the pupil dilates the need for the reading segment increases. It is an established optical fact that the depth or range of usable, sharp focus of a lens system decreases as the aperture increases and therefore the depth or range of sharp focus increases as the aperture decreases until at a pin hole size the depth of sharp focus is very great.

It is also understood that light rays entering the eye of its optical axis will pass through the clear part of the lens, and this has the effect of reducing the absorption of the lens as the image moves away from the optical axis. At approximately 20 degrees to each side of the optical axis the tint drops to approximately 50 degrees of the amount present on the optical axis. It will be noticed that the term approximate is used here. This is because the increase in brightness is dependent upon the size of the colored segment, pupil opening, the iris reflex, and the depth of the anterior chamber. This has no significant effect on the use of the lens as the lens moves with the eye and the area of maximum tint remains on the macula at all times. The added brightness in the periphery area has no significant effect pro or con since the change is of very gradual nature. This increased brightness may be of some help in the peripheral fields for the detection of motion since the visual acuity is very limited in the outer fields.

Figure 2:
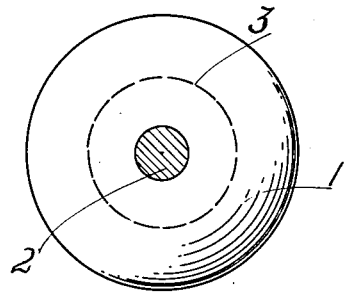
Figure 3:
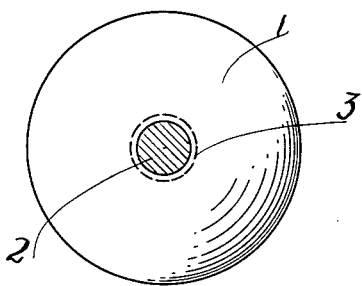
Figure 4:
Figure 5:
Figure 6:
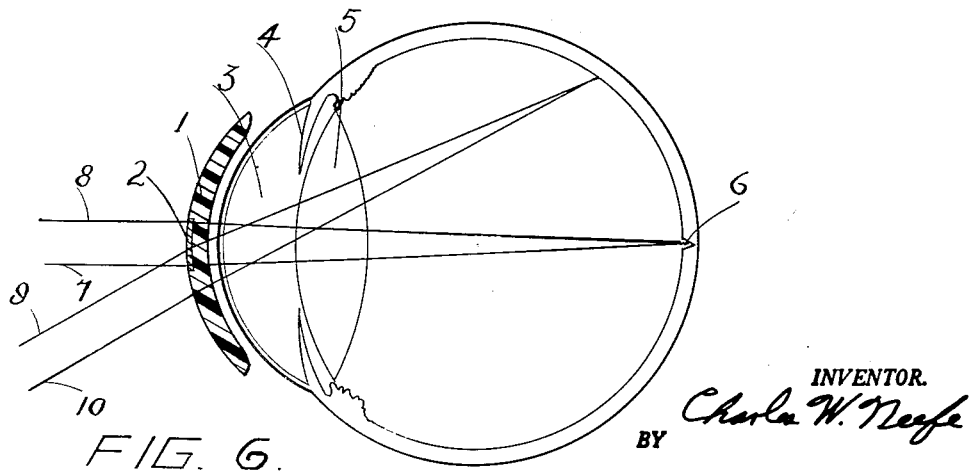

Referring now to the accompanying drawings:
FIGURE 1 shows the new lens from the front.
FIGURE 2 shows the new lens with the pupil dilated.
FIGURE 3 shows the new lens with the pupil contracted.
FIGURE 4 shows the tint on the surface.
FIGURE 5 shows the tint completely through the lens.
FIGURE 6 shows the new lens on the eye and the path of light rays through the lens and eye.

The construction of the variable tint lens is as follows:
FIGURE 1 shows the lens from a front view, area 1, FIGURE 1 being the clear or lighter part, area 2 being the darker tinted part.

FIGURE 2 shows area 1, the clear, and 2, the darker in relation to the dilated pupil, at 3, as it would be in the dark.

FIGURE 3 shows area 1, the clear, area 2, the darker, and 3, the pupil contracted as in bright sunlight.

FIGURE 4 shows the lens in section with the absorption area 2 dyed into either front or rear surface or both, area 1 being the clear or lighter area.

FIGURE 5 shows the lens in section with the absorption area 2 occupying the entire thickness of the central area of the lens, 1 being the clear or lighter area. This type may be made by drilling a hole in a clear plastic blank and inserting a colored plug or rod into the hole and securing it with cement of methyl methacrylate monomer and polymerizing the monomer or by adding colored monomer and polymerizing it into the lens. The lens and plug may also be heated to the softening point and a straight cylinder or slightly tapered plug inserted and the plastic allowed to cool. The lens is then cut from this blank. This process may also be used for making the pupil or pin hole type contact lens by starting with a black or dark colored blank and inserting a small plug of clear plastic.

Either of the methods may also be used for implant lenses, to replace the natural crystalline lens inside the eye, FIGURE 6, area 5, after surgery for cataracts.

FIGURE 6 shows the new variable density lens in place on the eye in section. Area 1 shows the clear or lighter segment, 2 shows the darker segment, 3 shows the pupil, 4 shows the iris, 5 shows the crystalline lens, 6 the macula, 7 and 8 two light rays passing through the darker section and focusing on the macula, 9 and 10 shows two light rays off the optical axis, 9 passing through the colored segment, and 10 passing through the clear segment.

I claim:

A protective contact lens for wear on the eye comprising a transparent concavo-convex lens fitted to the curvature of the eye and having a small, circular, tinted light absorbing area in the center of the lens, the diameter of said area being appreciably smaller than the diameter of the eye pupil when dilated in dim light and approximating the diameter of the eye pupil when contracted in bright light, whereby the tinted light absorbing area has a greater effectivity in overall light reduction in bright light and lesser effectivity in dim light.

References Cited in the file of this patent

FOREIGN PATENTS

| | | |
|---|---|---|
| 120,138 | Australia | June 29, 1945 |
| 317,690 | Great Britain | Aug. 22, 1929 |
| 510,946 | Great Britain | Aug. 8, 1939 |

OTHER REFERENCES

"Contact Lens Routine and Practice," Bier, textbook published in London, England, 1957, pages 118 and 120 cited.

"The Bifocal Contact Lens," article in "The Optician," vol. 135, No. 3498, April 18, 1958, page 361 cited.